Patented May 20, 1952

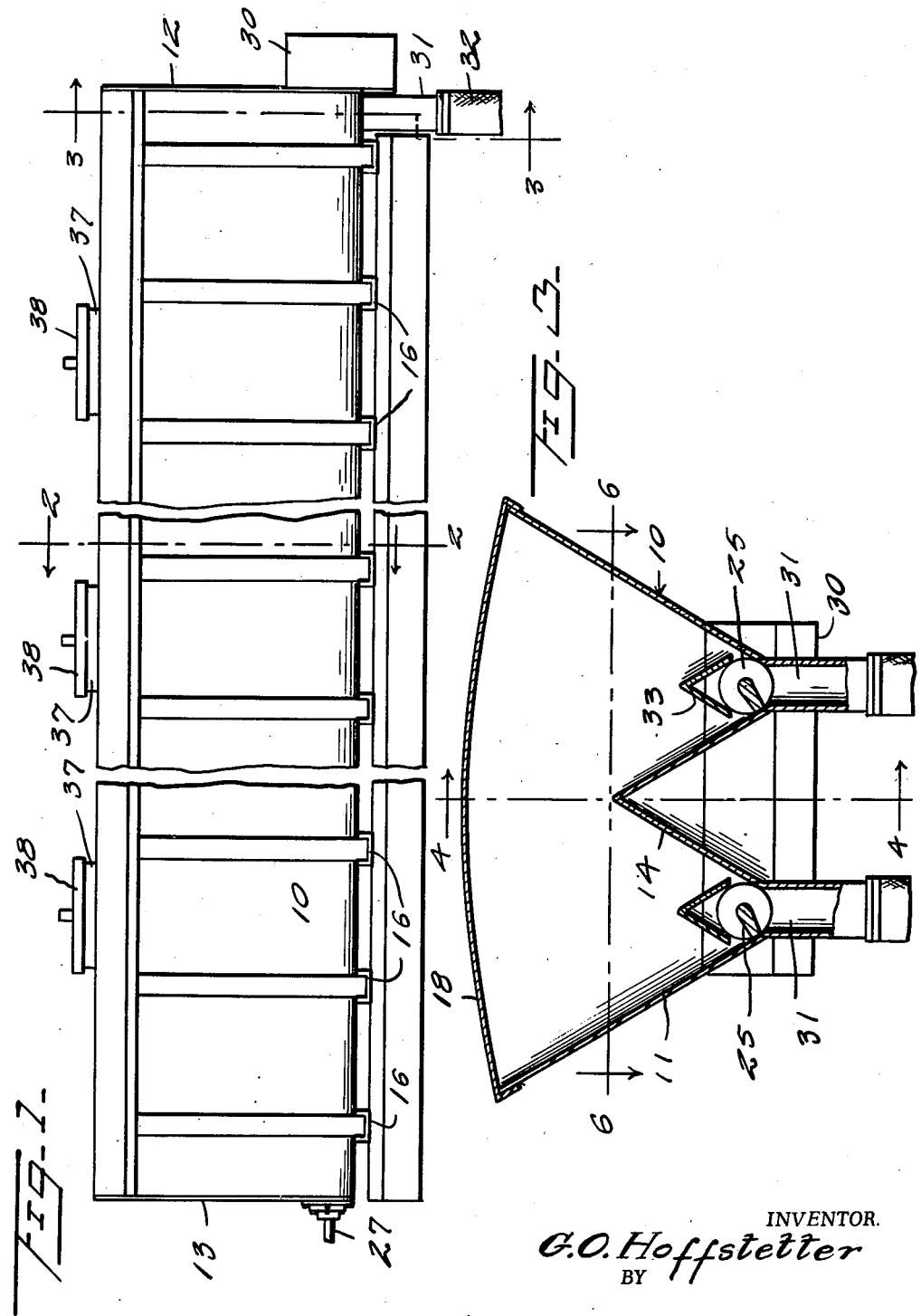

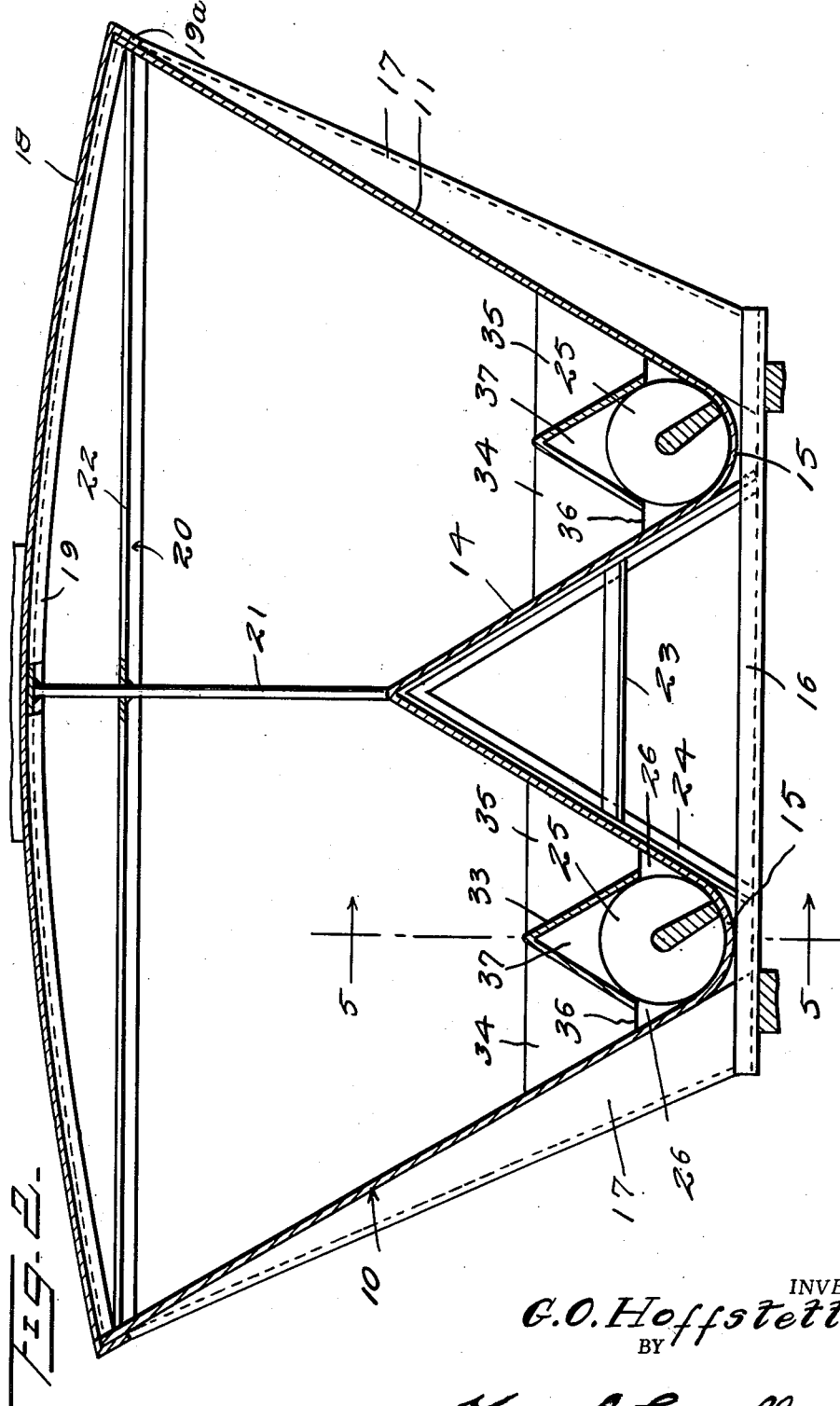

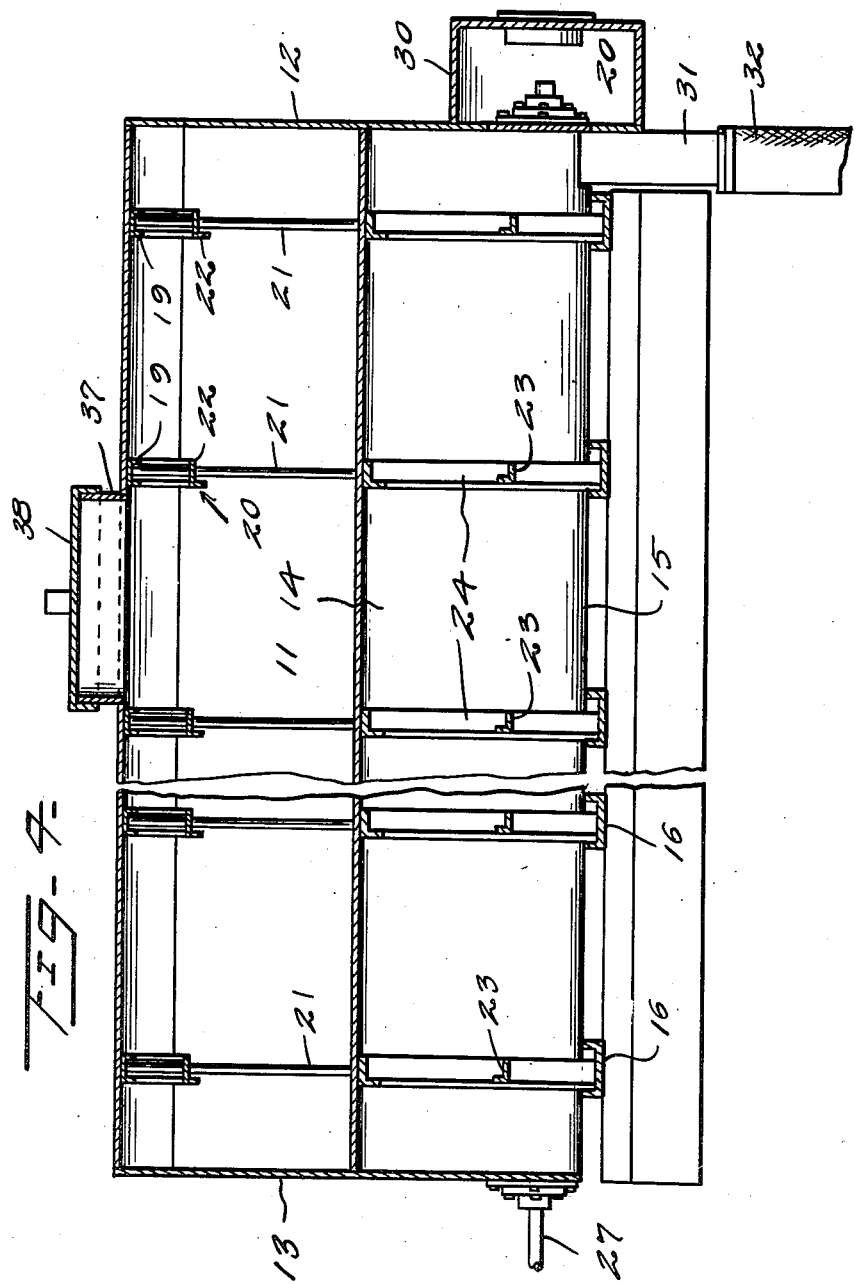

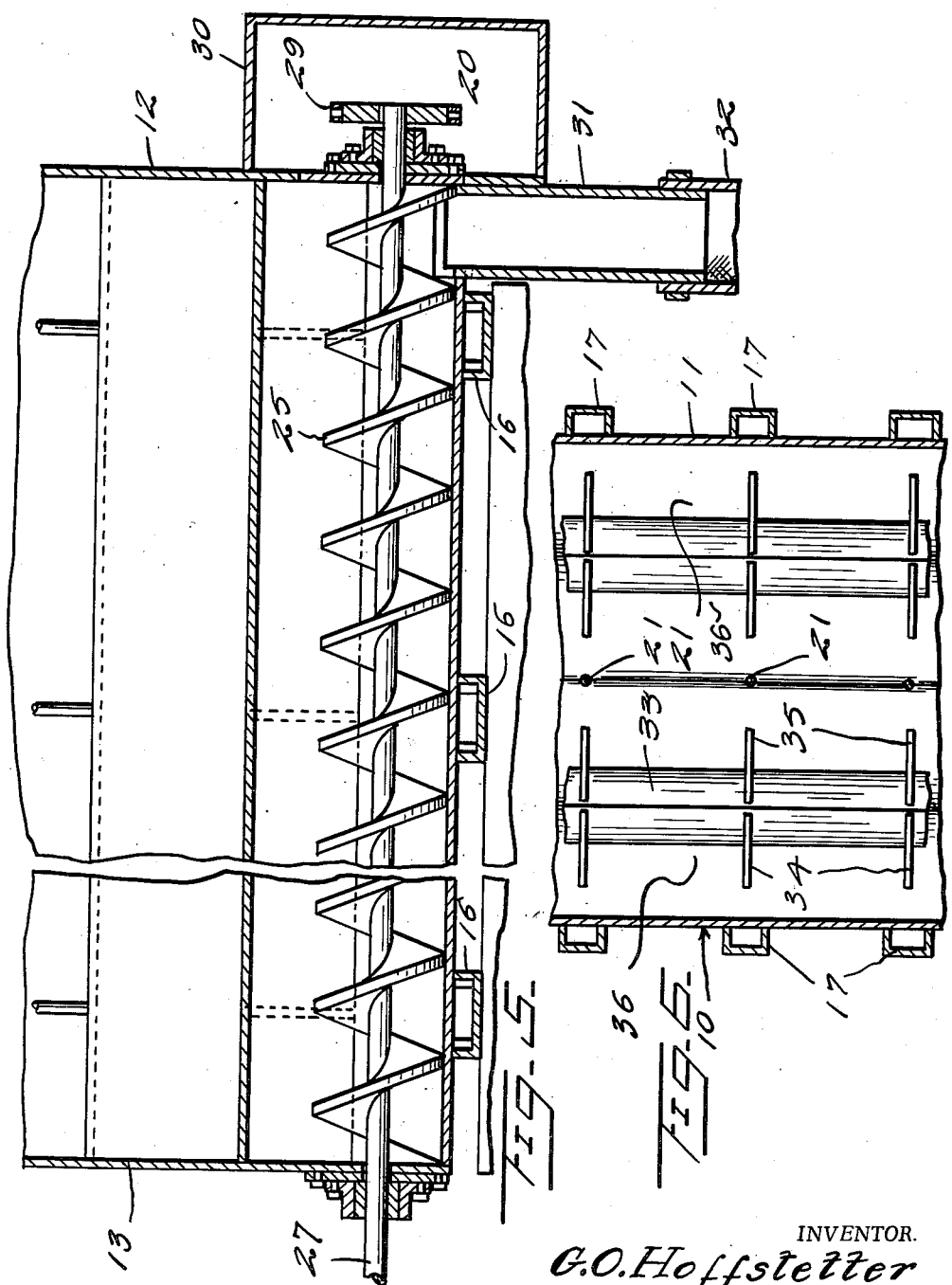

2,597,326

UNITED STATES PATENT OFFICE 2,597,326

DELIVERY HOPPER

George Otto Hoffstetter, Jerseyville, Ill.

Application May 19, 1949, Serial No. 94,155

1 Claim. (Cl. 222—270)

This invention relates to hopper bodies.

An object of this invention is to provide a hopper body which is constructed to deliver granular or powdered material, such as cement, lime or the like.

Another object of this invention is to provide in a hopper body, a screw conveyor at the bottom of the body, and means above the conveyor for keeping the weight of the material from the conveyor so that the latter can be rotated with a small power member.

A further object of this invention is to provide in combination with a hopper and screw conveyor, means for trapping air over the upper portion of the conveyor so that the conveyor will be under only partial load stress when initially rotated. With a structure to be hereinafter described, the conveyor can be easily started due to the entrapped air overlying substantially the upper half of the conveyor. As the conveyor rotates, the entrapped air will gradually mix with the material until the latter encompasses the conveyor at which time the conveyor will be operating under full load.

With the above and other objects in view, my invention consists in the arrangement, combination and details of construction disclosed in the drawings and specification, and then more particularly pointed out in the appended claim.

In the drawings,

Figure 1 is a detail side elevation, partly broken away, of a hopper body constructed according to an embodiment of this invention, Figure 2 is a sectional view taken on the line 2—2 of Figure 1, Figure 3 is a sectional view taken on the line 3—3 of Figure 1, Figure 4 is a longitudinal section, partly broken away, taken vertically through the hopper body.

Figure 5 is a fragmentary sectional view taken on the line 5—5 of Figure 2,

Figure 6 is a fragmentary sectional view taken on the line 6—6 of Figure 3,

Referring to the drawings, the numeral 10 designates generally a hopper body which is formed of outer upwardly divergent side walls 11, and opposite end walls 12 and 13. The body 10 also includes an inner inverted V-shaped wall 14 connected at its lower divergent ends to the side walls 11 by arcuate connecting wall members 15 which in the present instance form the bottom wall of a conveyor chamber.

The hopper 10 has extending across the bottom thereof a plurality of longitudinally spaced apart channel members 16, and upwardly extending and divergent channel members 17 extend from the lower channel member 16 along the outer sides of the side walls 11. A transversely curved top wall 18 formed with outer flanges 19a is secured over the upper end of the body 10, and the top wall 18 is secured to transversely extending channel members 19, said channel members being curved along their lengths.

A plurality of horizontally disposed and transversely extending angle-shaped bracing members 20 are secured between the upper portions of the side walls 11 below the channel members 19, and vertically disposed posts or bracing members 21 are secured between the apex of the inner member 14 and the channel members 19. The bracing members 20 extend through the horizontal sides 22 of the angle members 20, as shown in Figure 2, and are welded or otherwise secured thereto so as to firmly brace not only the channel members 19, but the horizontal bracing members 20.

A plurality of horizontally disposed bracing bars 23 are secured between the sides of the inverted V-shaped member 14 and angle-shaped bracing bars 24 are also secured to the walls of inverted V-shaped member 14 at the underside thereof, following the walls from their upper extremities of the apex of the V to their lower extremities where they are secured to the bottom channel member 16. There is a screw conveyor 25 in each conveyor chamber 26, which is adapted to be operated by any suitable means, having a conveyor shaft 27 extending from one end of the hopper body 10 and connected to a suitable power means.

A sprocket 28 may be connected to the opposite end of the conveyor shaft 27 so that the two conveyors may be connected by a chain 29 or other suitable connecting means, whereby the two conveyors may be operated from a single power means at one end of the hopper body. The sprocket 28 is disposed in a housing 30 which is secured to the wall 12 of the hopper body, and in practice the wall 12 is the rear wall. An outlet nipple or tube 31 extends from the rear end of the conveyor chamber 26, extending downwardly therefrom and a flexible tubular member 32 may be connected with the discharge nipple 31 for conveying the material into a suitable receiver.

In order to provide a means whereby the weight of the material in the body 10 may be held from the conveyors, and in order to provide means whereby the conveyors may be initially started under only partial load, I have provided an inverted V-shaped shield 33 which is disposed above each conveyor 25. The shield 33 is supported by means of supporting plates 34 and 35 which are welded between the adjacent side wall 11 and the shield 33, and between the shield 33 and the adjacent wall of the inverted inner bottom member 14. The lower edges of the shield 33 are spaced from the walls 11 and the wall of the bottom member 14, thereby providing spaces 36 within which a granular or powdered material is adapted to move for contact with the associated conveyor. The inverted V-shaped shield 33 forms an air pocket or chamber 37 above the conveyor 25 where air is entrapped during the loading or filling of the hopper. This entrapped air will prevent the granular or powdered material from flowing over the top portion of the conveyor 25 and in this manner when the conveyor 25 is first started for discharging the material, the conveyor is under only partial load. As the conveyor rotates, the air in chamber 37 will be gradually dissipated or mixed with the material so that the conveyor will gradually pick up the load until it is under full load.

As herein shown, the hopper body is provided with two screw conveyors and the material which is to be delivered is cement, lime or other powdered or granular material which is discharged into the hopper 10 through filler necks 37 carried by the top wall 18 at spaced intervals. Removable caps 38 are adapted to engage on the filler necks 37 after the hopper has been filled.

In the use and operation of this device, the conveyors 25 are connected with a suitable power device (not shown) and assuming that the hopper body 10 is filled with cement, this material will flow downwardly through the spaces 36, along the lower edges of the shields 33 into the conveyor chambers 26. The air chamber 37 will initially be filled with entrapped air so that the material will not completely cover the conveyor and in addition, the weight of the material above the conveyor will not rest on the conveyor.

With a construction as hereinbefore described, the conveyors are started under only partial load so that a relatively small power means may be used. Furthermore, due to the fact that the shields hold the conveyors from the weight of the material in the hopper, the weight of such material will not form a drag on the rotation of the conveyor.

I do not mean to confine myself to the exact details of construction herein disclosed, but claim all variations falling within the purview of the appended claim.

What I claim is:

A delivery hopper comprising a hopper body formed of downwardly convergent side walls, an inverted V-shaped member secured between the lower edges of said side walls and forming a pair of spaced apart conveyor channels, a screw conveyor in each channel, an inverted V-shaped shield disposed over each conveyor, the lower edges of said shield being spaced from said side walls and said V-shaped member, each of said inverted V-shaped shields being supported by a plurality of spaced pairs of inverted, truncated supporting members, each of said pairs consisting of a member fixedly and immovably connecting said shield at its adjacent hopper side wall and another member fixedly and immovably connecting said shield to its adjacent wall of said inverted V-shaped member.

GEORGE O. HOFFSTETTER.

REFERENCES CITED

The following references are of record in the file of this patent:

UNITED STATES PATENTS

| Number | Name | Date |
|---|---|---|
| 428,346 | Mueller | May 20, 1890 |
| 1,566,808 | Baker | Dec. 22, 1925 |
| 1,654,674 | Beaty et al. | Jan. 3, 1928 |
| 2,110,262 | Curtis | Mar. 8, 1938 |
| 2,412,121 | Bradshaw | Dec. 3, 1946 |